Oct. 31, 1944.  H. WILSON  2,361,671
COMBINATION CATALYTIC AND THERMAL CRACKING
Filed July 2, 1943
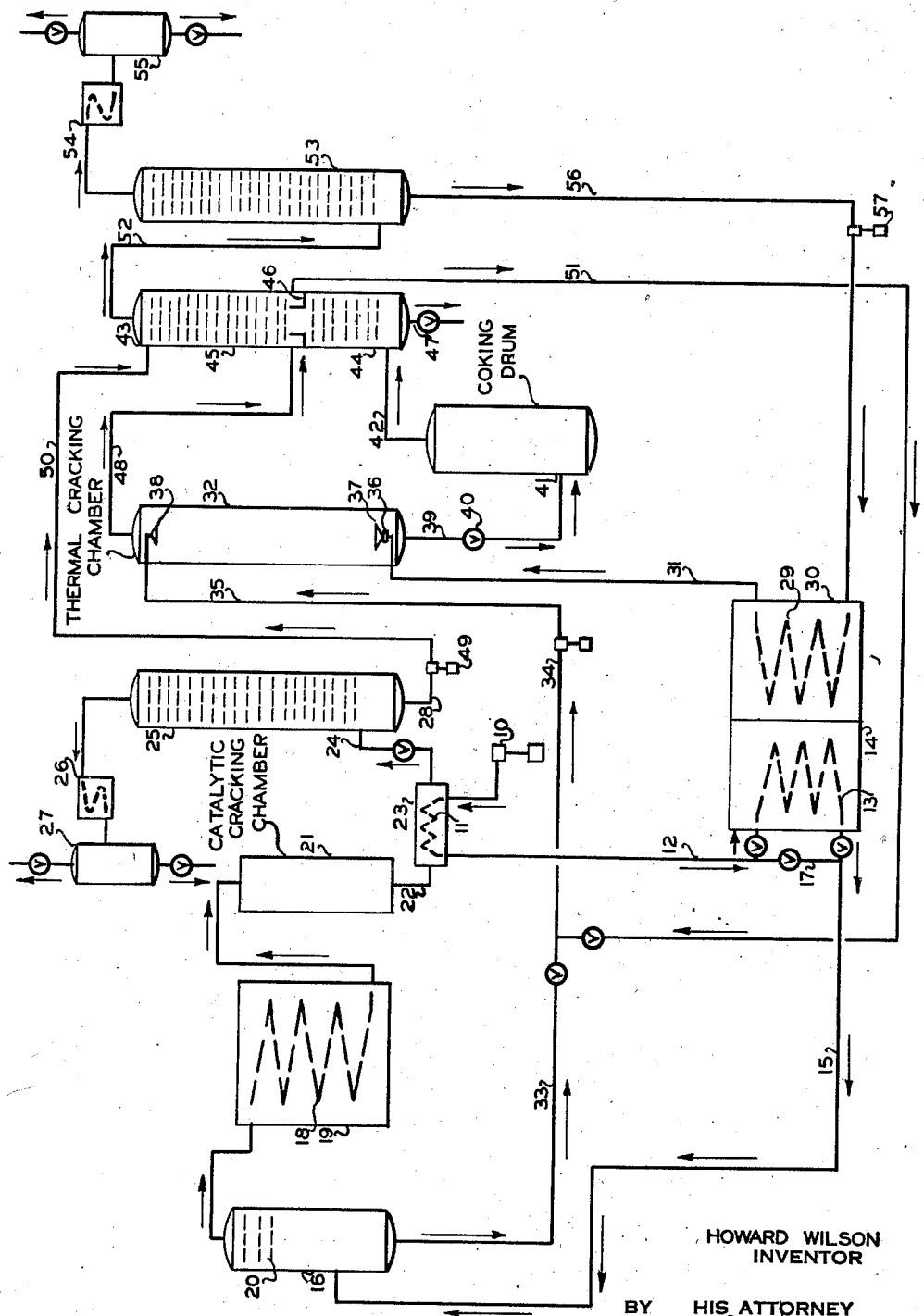
HOWARD WILSON
INVENTOR
BY HIS ATTORNEY Patented Oct. 31, 1944

2,361,671

UNITED STATES PATENT OFFICE 2,361,671

COMBINATION CATALYTIC AND THERMAL CRACKING

Howard Wilson, Lockport, Ill., assignor to The Texas Company, New York, N. Y., a corporation of Delaware Application July 2, 1943, Serial No. 493,199

4 Claims. (Cl. 196—49)

This invention relates to certain improvements in the combination catalytic and thermal cracking of hydrocarbon oils for the production of gasoline or motor fuel.

In accordance with the invention a petroleum stock is heated and subjected to vaporization, the volatilized constituents are subjected to catalytic cracking, the catalytically cracked products are separately fractionated to recover the catalytic gasoline and the higher boiling products are brought into contact with vapors from a thermal cracking step to subject such higher boiling products to fractionation and reconditioning and fractions are obtained which are adapted for different thermal cracking treatments.

For the purpose of more fully disclosing the invention reference is had to the accompanying drawing which is a flow diagram showing a preferred apparatus or system adapted for my improved process.

Charging stock, such as topped or reduced crude, is directed by a pump 10 through a heat exchange element 11 in contact with hot products, as is hereinafter explained, and the heated charge is passed through a line 12 to a heating coil 13 disposed in a furnace 14 wherein the oil is heated to a sufficient distilling temperature to vaporize the fractions desired for catalytic cracking. The heated effluent is discharged through a line 15 to a vaporizing and separating chamber 16. A line 17 is provided for by-passing the heating coil 13 in cases where the desired distilling temperature is obtained in the heat exchanger 11, although generally it is necessary to employ the additional heating in the coil 13 as is explained hereinafter. In an alternative operation the petroleum charging stock is subjected to cracking or visbreaking in the heating coil 13 so as to effect a conversion into intermediate constituents, such as gas oil fractions, adapted for catalytic cracking. The heated oil is separated into vapors and residue in the chamber 16 and the separated vapors pass directly to a heating coil 18 disposed in a furnace 19 adapted to heat the vapors to a temperature adapted for catalytic cracking. The vapors evolved in the chamber 16, particularly when cracking or visbreaking is carried on in the coil 13, are preferably subjected to dephlegmation in a dephlegmating zone 20 in order to prevent the delivery to the heating coil 19 of any high boiling liquid or tarry components.

The heated vapors from the coil 18 are contacted with a catalyst in a catalytic cracking zone 21. The catalyst employed consists advantageously of a synthetic silica-alumina type of catalyst. Various acid-treated and metal-substituted clays such as the Super-Filtrols and acid-treated and metal-substituted natural or artificial zeolites, such as the artificial zeolite known as Doucil may be employed. Various metals such as uranium, molybdenum, manganese, lead, zinc, zirconium, nickel and the like, may be substituted in the clays or zeolites. Likewise, the combination of certain acid-treated active clays of the character of Filtrol, together with added proportions of alumina or silica or both may be employed. Alumina alone may be used under certain conditions. The synthetic alumina catalysts can be improved by the addition of other constituents such as zirconium oxide or molybdenum oxide. The catalyst may be provided as a stationary bed through which the vapors pass, or the vapors may pass over a continuously moving mass of granular catalyst, or the catalyst in a finely divided, comminuted or powdered form may be suspended in the vapors being introduced into the reaction chamber, or suspended in a gaseous medium whereby the catalyst is carried along with the vapors through the reaction zone. In the fixed bed method of catalytic cracking a plurality of catalyst chambers may be used so that the catalyst may be regenerated without interrupting the continuity of the complete process, and in the case of the moving catalyst, the catalyst may be removed from the contacting reaction zone to a regenerating zone.

The products of the catalytic cracking pass through a transfer line 22 to a heat exchange element 23 wherein the products serve to preheat the charging stock passing through the exchange element 11. Only a portion of the heat is abstracted in the exchanger from the products of the catalytic cracking since a certain amount of heat is desirable for subsequent fractionation and consequently, as stated, it is normally necessary to additionally heat the charging stock in the coil 13. To accomplish the desired fractionation of the catalytically cracked products, they are delivered through a line 24 to a fractionator 25 wherein the higher boiling constituents are condensed or separated as liquid. The fractionator is provided with suitable cooling and refluxing so as to obtain a fractionated vapor fraction of desired endpoint. This vapor fraction passes to a condenser coil 26 and accumulator 27 wherein the catalytic light distillate is collected. The higher boiling products are withdrawn from the fractionator 25 through a line 28.

Catalytic cracking does not produce a large quantity of tar or residue of the type produced in thermal cracking. Nevertheless, the higher boiling product, particularly the product produced by catalytic cracking at very high cracking rates, frequently possesses a sufficiently high color and carbon residue that it is not well adapted for deep thermal cracking. In accordance with my invention this higher boiling product from the catalytic cracking step is brought into contact with the vapors from a thermal cracking step and subjected to reconditioning and to revaporization to obtain fractions adapted for separate thermal cracking treatments as will presently be explained.

Referring to this thermal cracking portion of the system, a heating coil 29 is disposed in a furnace 30 adapted to heat the oil to a cracking temperature. The heated oil passes through a transfer line 31 to a thermal cracking chamber 32 which is heat-insulated to maintain cracking temperature therein. Residue from the separator 16 is withdrawn through a line 33 and directed by a pump 34 through a line 35 to cracking chamber 32 for thermal cracking therein in contact with the heated effluent from the cracking coil 29.

In the preferred arrangement, the reaction chamber 32 is vertically disposed to provide for countercurrent contacting of the streams introduced thereto. As illustrated, the transfer line 31 extends within the lower portion of the reaction chamber and terminates in an enlarged pipe or section 36 through which the heated products are discharged in an upward direction against a baffle 37. In practice with a three-inch transfer line the element 36 may be composed of a six-inch pipe. A relatively light stock is subjected to vaporization and cracking in the heating coil 29 and consequently the heated products passing through the transfer line 31 will consist largely of vapors and gases and upon being discharged through the enlarged pipe 36 against the baffle 37 an efficient diffusion of the vapors and gases is accomplished. The transfer line 35 extends to an upper portion of the reaction chamber 32 and terminates in a distributor or spray nozzle 38. The spray 38 is arranged to discharge the liquid oil in a downward direction through the chamber so as to bring the liquid oil into intimate contact with the rising vapors. It is desirable to have an unobstructed space between the distributor 37 and the spray nozzle 38 free from baffles or any other contact elements upon which coke might deposit.

Separation of vapors from liquid residue takes place in the reaction chamber 32. The liquid residue is rapidly withdrawn so as to prevent the accumulation of liquid and thereby enable the maintenance of high cracking temperatures in the reaction chamber. The residue is directed through a draw-off line 39 and pressure-reducing valve 40 to a coking drum 41 for autogenous coking. By reason of the countercurrent contacting in the reaction chamber and the avoidance of the accumulation of liquid therein, it is possible to hold the reaction chamber at a sufficiently high temperature that, while coking is prevented, a complete conversion to coke residue is accomplished, solely by the contained heat of the residue, upon delivery to a lower pressure chamber 41. A very slight amount of vapor may be withdrawn with the liquid; an amount merely sufficient to insure that no liquid level is maintained in the reaction chamber. In practice a plurality of coking drums are employed so as not to interrupt the continuity of the complete process for the purpose of coke removal. The coking drums are suitably heat-insulated.

The vapors from the coking drum pass through a vapor line 42 to a primary dephlegmating zone. As illustrated, a tower 43 is provided having a lower section 44 and an upper section 45 separated by a trapout tray 46. The vapor line 42 communicates with the section 44 in which the vapors from the coking operation are subjected to a primary dephlegmation for the purpose of segregating the synthetic or polymer fuel oil which is withdrawn through a line 47.

The separated vapors from the cracking chamber 32 pass through a vapor line 48 which communicates with the fractionator 43, preferably extending to the fractionating section 45, to thus combine the vapors from the reacion chamber wih the dephlegmated vapors from the coking operation. The higher boiling product obtained in the fractionation of the catalytically cracked products, withdrawn through the line 28, is directed by a pump 49 through a line 50 to the fractionating zone 45 wherein it is subjected to vaporization and refractionation in contact with the vapors derived from the thermal cracking operation. Higher boiling condensate, withdrawn from the tray 46, is passed through a line 51 and combined with the residue from the vaporizer 16 for introduction to the upper portion of the thermal cracking chamber 32. The uncondensed vapors pass through a vapor line 52 to a fractionator 53 wherein fractionation is conducted to separate reflux condensate from lower boiling vapors which are passed to a condenser 54 thence to an accumulator or gas separator 55 wherein the distillate is collected. The reflux condensate withdrawn from the fractionator 53 through a line 56 includes constituents from the thermal cracking operation as well as reconditioned and refractionated components from the catalytic cracking operation. And this reflux condensate is directed by a pump 57 to the cracking coil 29.

In practicing the invention a charging stock such as topped crude petroleum is preheated to a desired distilling temperature and, if desired, subjected to visbreaking in the heating coil 13 and the heated or visbroken products are discharged into the evaporator 16. The overhead vapors, at temperatures approximating 600–800° F., are passed to the heating coil wherein the vapors are heated to a temperature of the order of 900–1000° F. and then brought into contact with a catalyst such as a synthetic composite of precipitated silica and alumina and subjected to catalytic cracking. The catalytic cracking is preferably conducted at relatively low pressures such as from atmospheric pressure up to about 100 lbs. pressure. After recovering the catalytic gasoline from the products of the catalytic cracking, the higher boiling products are directed to the fractionator 45 for refractionation together with the vapors from the thermal cracking chamber. The resultant high boiling reflux condensate, as withdrawn from the tray 46, is combined with the crude residue and the mixture is directed to the upper portion of the thermal cracking chamber. The vapors from the fractionator 45 are subjected to further fractionation in the tower 53 to recover the thermally cracked gasoline and obtain a reflux condensate of the nature of light gas oil which is subjected to thermal cracking in the heating coil 29 at temperatures such as 1000–1050° F. and delivered to the lower part of the thermal reaction chamber 32. Temperatures upwards of 900° F. are maintained in the reaction chamber with pressures of 200-600 p. s. i. Liquid is prevented from accumulating in the reaction chamber by the rapid withdrawal thereof and the withdrawn liquid is flashed to coke by means of its contained heat in the coking drum.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the combination thermal and catalytic cracking of hydrocarbon oils the process that comprises heating a crude petroleum stock, separating the heated stock into vapors and residue in a separating zone, subjecting the vapors to catalytic cracking, separately fractionating the resultant catalytically cracked products to separate lower boiling products from higher boiling products, passing cycle condensate through a heating zone wherein it is subjected to cracking temperature, withdrawing the separated residue from said separating zone and combining it with the heated effluent from the heating zone for thermal cracking in a reaction zone maintained under cracking conditions of temperature and pressure, separating the resultant thermally cracked products into vapors and residue entirely extraneously of the aforesaid separating zone, passing the separated vapors to a dephlegmating zone, introducing higher boiling products separated from the products of the catalytic cracking into said dephlegmating zone and subjecting the constituents therein to fractionation to separate vapors from a higher boiling reflux condensate, directing said higher boiling reflux condensate to the thermal cracking zone, subjecting the separated vapors to further fractionation to separate a reflux condensate from lighter products, and recycling said reflux condensate to the aforesaid heating zone.

2. In the combination thermal and catalytic cracking of hydrocarbon oils the process that comprises heating a crude petroleum stock, separating the heated stock into vapors and residue, subjecting the vapors to catalytic cracking, fractionating the resultant catalytically cracked products to separate lower boiling products from higher boiling products, passing cycle condensate through a heating zone wherein it is subjected to cracking temperature, combining the heated effluent from the heating zone with the aforesaid residue for thermal cracking in a reaction zone maintained under cracking conditions of temperature and pressure and wherein separation of vapors from residue takes place, passing the separated vapors to a dephlegmating zone, withdrawing residue from said reaction zone and subjecting it to coking, dephlegmating the evolved vapors from the coking zone, directing the dephlegmated vapors to the aforesaid dephlegmating zone for fractionation together with the vapors from said thermal reaction zone, introducing the higher boiling products from the catalytic cracking into said dephlegmating zone and subjecting the constituents therein to fractionation to separate a higher boiling reflux condensate from vapors, directing said higher boiling reflux condensate to said thermal reaction zone, subjecting the separated vapors to further fractionation to separate lower boiling products from reflux condensate, and recycling said reflux condensate to the aforesaid heating zone.

3. In the combination thermal and catalytic cracking of hydrocarbon oils the process that comprises heating a crude petroleum stock, separating the heated stock into vapors and residue, heating the separated vapors to a temperature adapted for catalytic cracking, contacting the heated vapors with a cracking catalyst to effect catalytic conversion into lower boiling hydrocarbons, fractionating the resultant catalytically cracked products to separate lower boiling products from higher boiling products, passing cycle condensate through a heating zone wherein it is heated to effect vaporization and thermal cracking, introducing the resultant heated products to the lower portion of a vertically disposed cracking chamber wherein vapors separate from liquid residue, directing the crude petroleum residue to the upper portion of said cracking chamber for countercurrent contact with the upwardly rising vapors therein, maintaining a cracking temperature under superatmospheric pressure in said cracking chamber to subject the constituents therein to thermal cracking, rapidly withdrawing liquid residue therefrom to prevent the accumulation of liquid residue therein, flashing the withdrawn residue to coke by means of its contained heat, dephlegmating the separated vapors from said cracking chamber and vapors from the coking operation with said higher boiling products from the catalytic cracking to produce a higher boiling liquid fraction and a vapor fraction, combining said higher boiling liquid fraction with the crude residue for introduction therewith to the upper portion of the thermal cracking chamber, subjecting said vapor fraction to further fractionation to separate a reflux condensate from lighter products and recycling said reflux condensate to the aforesaid heating zone.

4. In the combination thermal and catalytic cracking of hydrocarbon oils the process that comprises subjecting a residual stock to cracking conditions to produce viscosity breaking, separating the resultant products into vapors and residue in a separating zone, subjecting the vapors to catalytic cracking, separately fractionating the resultant catalytically cracked products to separate lower boiling products from higher boiling products, passing cycle condensate through a heating zone wherein it is subjected to cracking temperature, withdrawing the separated residue from said separating zone and combining it with the heated effluent from said heating zone for thermal cracking in a reaction zone maintained under cracking conditions of temperature and pressure, separating the resultant thermally cracked products into vapors and residue entirely extraneously of the aforesaid separating zone, passing the separated vapors to a dephlegmating zone, introducing higher boiling products separated from the products of the catalytic cracking into said dephlegmating zone and subjecting the constituents therein to fractionation to separate vapors from higher boiling reflux condensate, directing said higher boiling reflux condensate to the thermal cracking zone, subjecting the separated vapors to further fractionation to separate a reflux condensate from lighter products and recycling said reflux condensate to the aforesaid heating zone.

HOWARD WILSON.